July 8, 1924.
E. P. HALLIBURTON
METHOD OF AND APPARATUS FOR MIXING MATERIALS
Filed Jan. 4, 1924
1,500,385
2 Sheets-Sheet 1
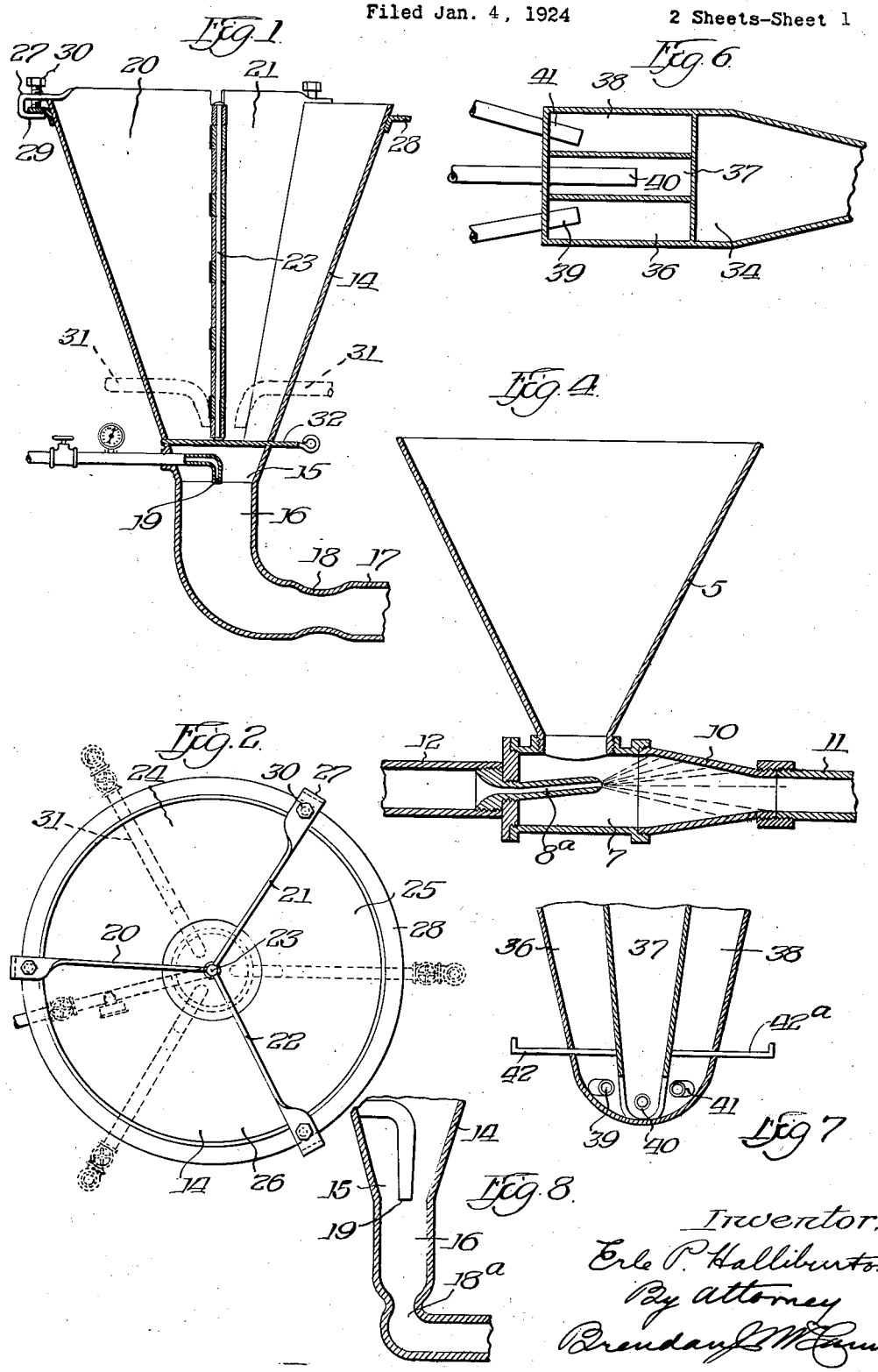

July 8, 1924.
E. P. HALLIBURTON
1,500,385
METHOD OF AND APPARATUS FOR MIXING MATERIALS
Filed Jan. 4, 1924   2 Sheets-Sheet 2
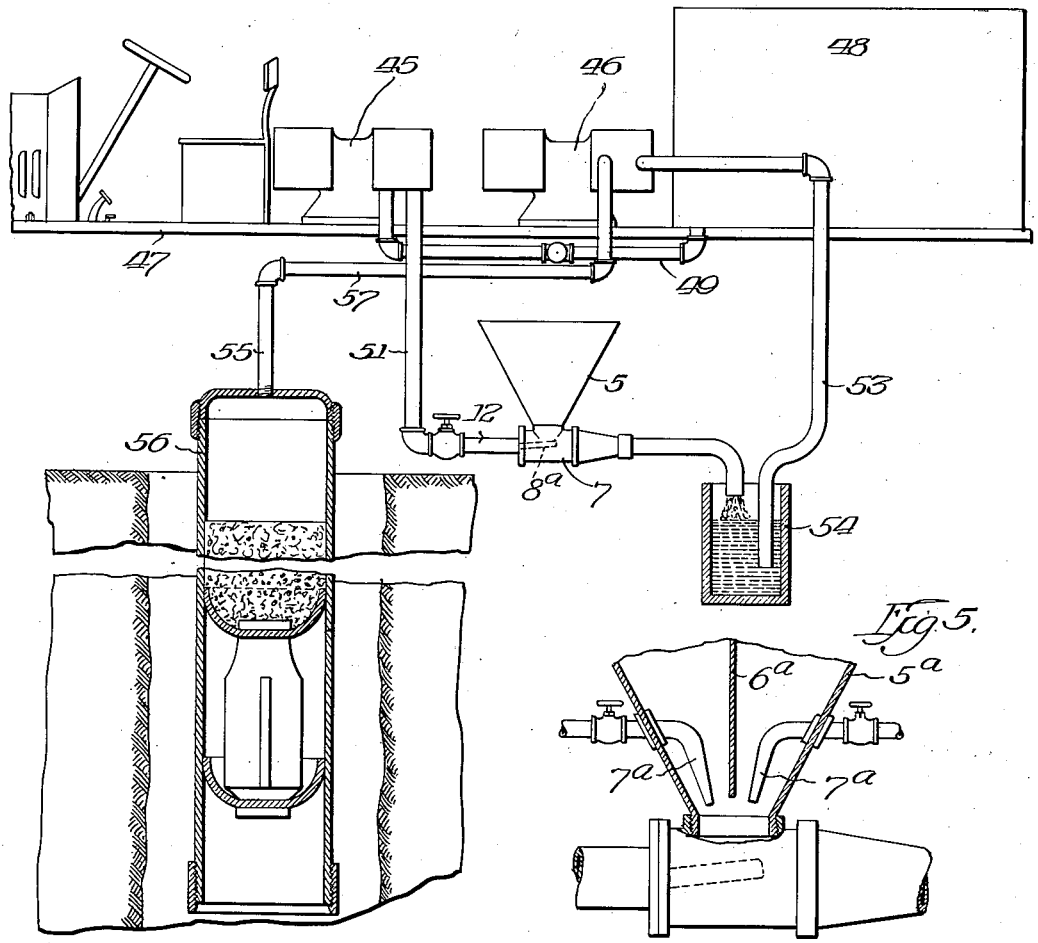
Fig. 9
Fig. 5.
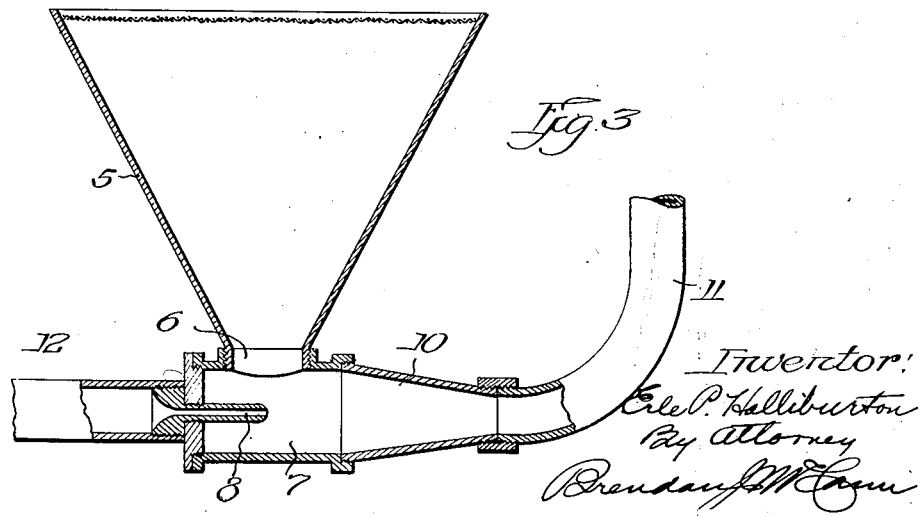
Fig. 3
Inventor:
Erle P. Halliburton
By Attorney
Brendan J. McCann Patented July 8, 1924.

1,500,385

UNITED STATES PATENT OFFICE.

ERLE P. HALLIBURTON, OF DUNCAN, OKLAHOMA.

METHOD OF AND APPARATUS FOR MIXING MATERIALS.

Application filed January 4, 1924. Serial No. 684,379.

*To all whom it may concern:*

Be it known that I, ERLE P. HALLIBURTON, a citizen of the United States, and a resident of Duncan, in the county of Stephens and State of Oklahoma, have invented certain new and useful Improvements in Methods of and Apparatus for Mixing Materials, of which the following is a specification.

This invention relates broadly to changing the state or condition of materials and embodies improvements in the reduction and mixture of materials, comminuted or broken, such as cement, sand, crushed stone and the like, to a plastic state for use, and more particularly pertains to an improved method of and apparatus for mixing and delivering hydraulic cement or any other comminuted substance with water or any other suitable liquid, or, for example, for mixing hydraulic cement or lime with crushed stone, sand, or any other mixture of comminuted or pulverulent materials which may be desired.

While, as an example of one employment of this invention, it is illustrated and described for the purpose of mixing cement and water or cement sand stone or the like and water or other liquid, it will be readily understood that any other ingredient and fluid or ingredients and liquid or fluid may be brought together to form a mixture, and therefore the invention finds a wide field of utility for purposes other than that described herein.

This invention further relates to an improved method of and apparatus for reducing hydraulic cement or other comminuted material to a state of fluidity for use, including the additional step of deposition of the resulting mixture or mixtures at a point of use before change in the chemical state of the mixture, such, for example, in the cementing of oil wells and the like, though, of course, the method and apparatus may be employed satisfactorily for reducing cement or any other material to a state of fluidity and the deposition of such material where desired.

I contemplate the provision of an improved method of and apparatus for reducing cement or other comminuted substances to a state of fluidity for use; the provision of an improved method of and apparatus for reducing cement and other comminuted substances to a state of fluidity as a mixture; the provision of an improved method of and apparatus for reducing cement or other comminuted materials to a state of fluidity and for depositing such materials at a point for use before chemical reaction or other changes take place in the fluid material or mixture of materials; the provision of an improved method of and apparatus for reducing cement per se to a state of fluidity, or for mixing such cement with other comminuted materials; the provision of an improved method of and apparatus for reducing cement to a state of fluidity and the conveyance of such cement to a point for use; the provision of an improved method of and apparatus for mixing cement and water or other fluid; the provision of means for carrying out the method above referred to; the provision of improved means for mixing hydraulic cement, of the proper consistency for use in cementing oil wells; the provision of an improved method of combining cement and fluid in variable proportions for producing a plastic composition of various consistencies and in various quantities per unit of time; the provision of improved means for combining cement and water or cement, water and other comminuted substances in variable proportions for producing a mixture in plastic state suitable for use in cementing oil wells, or for other purposes, and operable to produce a plastic composition continuously of one consistency and quantity per unit of time, or to produce a composition of various consistencies without interruption of the process; and the provision of means for carrying out the method outlined above and possessing the features referred to which is simple, compact, unitary, efficient in operation, and capable of manufacture at low cost.

This invention is further characterized by the provision of improved apparatus for mixing cement and water in proper proportions for use in cementing oil wells and the like; the provision of improved apparatus for mixing dry cement and water in proper proportions for introduction in semi-liquid state into oil and gas wells for shutting out water from the oil bearing sands, and to this end is particularly adapted to use in connection with the cementing apparatus and process disclosed in my Patent No. 1,369,891, and this application forms in part, a partial continuation of my application Serial No. 569,738.

A further characteristic of this invention is more particularly the reduction of substantially dry cement per se or with crushed stone, etc., to a plastic state by introduction of a quantity of such material into a preferably high velocity stream of non-compressible fluid, such as water, wherein by the control of the water pressure and consequent velocity of the stream, and the rate of discharge of the plastic mixture, I am enabled to regulate the mixture produced.

This invention is still further characterized by the provision of an improved method and means for mixing cement and liquid by a high velocity stream of such liquid; the provision of an improved method of and apparatus for mixing cement and other comminuted materials and a liquid by the action of a high velocity stream or streams of such liquid; the provision of an improved method of and apparatus for mixing cement and other comminuted materials and a liquid by a high velocity stream or streams of such liquid in combination with the step and apparatus for substantially immediately introducing the mixture either of cement and liquid or cement, liquid and other comminuted material into the place at which the mixture is to be permitted to set or adjacent thereto, whereby the mixture does not have an opportunity to prematurely set.

I have found that by the employment of a high velocity stream or streams or current of water or other liquid acting upon a body of cement, or other comminuted material or cement, crushed stone and the like, and the substantially simultaneous delivery of the mass to the position of set, that due to the high impregnation of the cement by the liquid, I am enabled to expedite the set after the material is delivered, and I find that because of the high degree of mix obtained it is desirable that a substantially immediate delivery of the mass to the point of use be made, and that this is an advantage, for instance, in cementing oil wells, sinking concrete piles, and the like, where time is an important factor in the successful and efficient completion of the job. I have also discovered that in the employment of my invention, for instance, for providing a fluid cement for cementing oil wells, by upon combining one cubic foot of cement and two-thirds cubic foot of water, a total volume of from one and one-tenth to one and one-eighth only results, so that it will be observed that a high degree of impregnation of the cement by the liquid is the result of the operation of this invention.

The foregoing and such other objects and advantages as may appear as this description proceeds are attained in the various structural embodiments of this invention illustrated in the accompanying drawings, and in which:

Figure 1 is a vertical sectional view of a structural form of this invention;

Figure 2 is a top plan of the same, showing a modification in dotted lines;

Figures 3 and 4 are vertical sectional views of alternate forms of this invention;

Figure 5 is an alternate form of the device shown in Figures 3 and 4;

Figures 6, 7 and 8 are sectional views of further alternate forms of the device shown in Figures 1 and 2; and Figure 9 is an assembly illustrating the device employed for mixing and deposition of cement and the like.

Referring more particularly to the invention, and first to the method embodied herein, the mixing of a plurality of materials such as hydraulic cement and lime, or other cement, with crushed rock, stone, gravel and sand, is accomplished by me by introducing two or more of such materials into a stream or streams or current of liquid of high velocity, the actual induction of the materials into said stream being brought about largely by the high velocity of the stream itself, and the subjection of a quantity of the materials to the action of the stream, which, I have found, creates a vacuum or partial vacuum, or region of suction, the mass or masses of materials forming, in effect, a piston, which is advanced toward the stream, and such materials, upon entering the stream are not only thoroughly mixed with each other, but also with the liquid of the stream.

I find that this mixing may be accomplished in various ways, such, for instance, by placing the material or materials together in one hopper or in a plurality of adjacent chambers in a single hopper from which the materials may be automatically fed by the action of one or a plurality of streams of water or other fluid, preferably liquid, and I also find that while a regulation of the movement of the materials may in some cases be desirable, such regulation, under ordinary conditions is not required, the proportions of the ingredients of the resulting mixture being automatically attained by the action of the stream itself.

In mixing or preparing a mixture of cement and water for use in cementing oil wells, where it is desirable that a readily fluent mixture be available, and of low viscosity, excellent results are attained by me, and the employment of a high velocity stream of water for both inducting the cement and mixing with such water not only produces a better material when set, but actually expedites the setting to a point where, by my method, the cementing of oil wells, for instance, has in time consumed, been reduced from hours to a matter of minutes.

In the preparation of this cement grout, I place a quantity of the cement in a suitable hopper, and keep this hopper filled as long as necessary for the particular job. I then direct a stream of liquid, water, for instance, either through the cement, which prior to this, is preferably substantially dry, or pass such stream or current of water through a chamber which in effect forms a mixing chamber, and due to the high velocity of the stream of water, the cement is inducted into the stream in direct proportion to the rate of flow of the stream, discharging, if desired, subject to slight retardation, whereupon a mixture of cement and water is provided suitable for the particular purpose.

I may regulate the velocity of the stream for varying the quantity of mixture produced, or I may vary the degree of retardation for varying the degree of impregnation of the cement by the liquid. This impregnation of the cement by the liquid, as pointed out in my pending application referred to hereinbefore, is important, though not, as far as I have been able to determine due solely to the retardation, because I have obtained very satisfactory results without employing positive retardation.

While, in general, my practice is to employ a retarding means in the discharge portion of the mixer, it will be readily understood that such means is not essential to the successful and efficient production of a proper mixture, at least, for use in cementing oil wells and the like.

I have employed my improved mixing device in conjunction with apparatus which takes the mixture, substantially immediately after the mixing operation is completed and delivers the mixture to a point for use, for instance, deposits the mixture in an oil well casing, whereupon the cement grout, so-called, is forced back of the casing and allowed to set. I find that due to the high degree of mix produced by my improved mixer that a set of the mixture takes place very quickly, and therefore, in actual operation in the field, in order to take advantage of this feature, I have designed the apparatus so that the mixture may substantially immediately be introduced into the place where it is to set, this being somewhat schematically illustrated in the drawings.

Referring now to the mixing device in one of its simpler forms where employed for making a cement grout, or highly fluent mixture of cement and water, and for this purpose, referring first to Figures 3 and 4, I provide a hopper 5, provided with a bottom outlet 6, to a mixing chamber 7, in which latter is mounted a nozzle 8. While the structure employed here is shown with the mixing chamber as horizontal, it will be understood that the angularity of this chamber does not materially affect the operation, and merely happens to be a convenient arrangement.

The rear wall 9 of the mixing chamber serves to support the nozzle so that the discharge aperture of same lies at a point just below one side of the outlet of the hopper or between the center of said outlet and one side thereof. The desired region of suction is created regardless of whether the nozzle is in the position shown or forward thereof.

A swedge nipple 10 is secured in the forward or discharge end of the mixing chamber, and said nipple may be connected to a sinuated conduit 11. The sinuated conduit is not essential to the production of a satisfactory mix, but has been employed by me. A conduit 12 is connected to the nozzle 8 in order that water or other liquid under high pressure may be supplied to said nozzle. In the operation of this device the passage of the water through the mixing chamber creates a region of suction therein and at the outlet of the hopper thus inducting cement with the water.

In Figure 4 the parts are substantially identical with that of the device of Figure 3, with the exception that the nozzle 8ª is directed slightly upwardly so that the stream of water and the cement are caused to impinge upon one of the sides of the swedge nipple.

Both of the devices of Figures 3 and 4 operate equally well with or without the swedge nipple, and substantially the same results are obtained with the nozzle as in Figure 4 without the swedge nipple.

Referring now to Figures 1 and 2, I have here provided a hopper 14, having an outlet 15 to a vertical substantially cylindrical mixing chamber 16. The lower end of the mixing chamber 16 is turned laterally to form an outlet pipe 17 in which I provide a constriction 18.

A nozzle 19 is disposed at the top of the mixing chamber, preferably at substantially the center thereof, so that material, such as cement, which may be deposited in the hopper 14, will, by the action of gravity and the force of the stream of fluid downwardly directed, cause the cement to enter the mixing chamber, be mixed therein with the liquid issuing from the nozzle 19, and be discharged mixed with such liquid through the pipe 17. The constriction 18 serves to sufficiently retard discharge of the mixture so that a thorough mixing of the liquid and material is effected. It will be observed that the nozzle is placed at the junction of the hopper and mixing chamber as well as on the vertical axis of the latter, in order to prevent boiling back of the mixture due to cross eddies. However, I have found that in actual practice the nozzle may be placed at an angle to the vertical without seriously affecting the operation.

Upon reference to Figure 8, it will be observed that I have provided a modified form of the device shown in Figures 1 and 2, wherein the constriction 18ª is placed immediately below or in the mixing chamber, as distinguished from its lateral position as shown in Figure 1.

The operation of the form of the invention shown in Figures 1, 2 and 8 is substantially identical with that shown in Figures 3 and 4, when employed for making cement grout.

When the device of Figures 1, 2 and 8 is employed for mixing cement, crushed stone and sand, or other comminuted solids, I provide means whereby these materials may be deposited in the hopper 14 and substantially isolated until the actual mixing takes place. For this purpose I provide the partitions 20, 21 and 22, although the number may be increased as desired, and these partitions are connected by a common hinge 23, so that the relative angularity of the partitions may be changed for varying the size of the compartments 24, 25 and 26 formed thereby. For securing the partitions in proper fixed position, each of the upper edges of said partitions are provided with extensions which overlie the annular flange 28 formed on the outer face of the wall of the hopper. The extensions 27 are provided with hook portions 29 which underlie the flange 28 and set screws 30 pass through said extensions for securing the partitions in desired positions.

If desired a nozzle may be provided for each of the compartments, for instance, as shown in dotted lines at 31—31 in Figures 1 and 2, to be used separately or in conjunction with the nozzle 19, although these auxiliary nozzles are not essential, as the nozzle 19 in most cases will suffice to draw the materials out of the compartments. A slide valve 32 may be placed below the partitions 20, 21 and 22 for an obvious purpose.

The same general plan is adopted in Figure 5 to that shown in Figures 1 and 2, where a plurality of materials are to be mixed in a device like that of Figures 4 and 5, the hopper 5ª having a partition 6ª forming compartments which have outlets to the mixing chamber 7. It will be understood that a plurality of nozzles may be employed in this form of the invention as well as in the form shown in Figures 1 and 2, the auxiliary nozzles being indicated at 7ª—7ª.

The device illustrated in Figures 6 and 7 embodies the idea of placing the nozzles all in a substantially horizontal plane, and to this end the device comprises a mixing chamber 34, a hopper 35, having partitions forming three compartments 36, 37 and 38, below each of which are arranged complemental horizontal nozzles 39, 40 and 41, for the same purpose as the nozzles previously described. By closing off the compartments 36 and 38 by the slide valves 42 and 42ª, the center compartment may be employed for making cement grout.

Referring now to Figure 9, wherein the complete system for preparation of the cement mixture which I employ in shutting off water in oil and gas wells is shown, I provide two fluid pumps 45 and 46, respectively, these pumps being conveniently mounted upon the chassis 47 of a motor truck or other suitable vehicle. The pump 45 is used for mixing, and will be referred to as the mixing pump, and the pump 32 is the well pump, which serves to introduce the hydrated cement into the well casing. A suitable water storage tank 48 may be conveniently disposed upon the chassis 47, and said tank is connected, directly through a conduit 49, with the mixing pump, a suitable valve 50 controlling flow through said conduit 49. The mixing pump is furthermore connected with the conduit 12 by a vertical pipe section 51, a suitable valve 52 controlling quantity and velocity of flow through the pipe sections 51 and 12. This may be accomplished as well by varying the speed of the pump 31. It will, of course, be readily appreciated that the conduit 49 might be connected to and draw water from any available source of supply. Thus, it will be observed, I am enabled to regulate to a nicety the consistency of the mixture by proper manipulation of the valve 52 and pump 45 and size of the swedge nipple.

The well pump 46 is connected through suction pipe 53 to a sump 54, and discharges at 55, into the well casing 56, through a conduit 57. The conduit 57 is connected to the casing 56, and the well prepared for cementing, preferably by the provision of the structural elements described in my prior Patent 1,369,891, not shown here. The two pumps 45 and 46 are preferably of the duplex piston type, driven in any suitable manner. It will be seen that in cementing an oil or gas well, it is necessary in most instances to use pressure to get the cement down into the well, consequently the preferred employment of the well pump 46, as previously pointed out, instead of directly depositing the hydrated cement mixture in the well casing.

From the foregoing it will be seen that the mixing pump serves to prepare the hydrated cement and deliver it in semi-liquid form to the sump 54, where any entrained air necessarily escapes whence the mixture is withdrawn by the well pump as required.

The relative speeds of the pumps may be varied as proper to take care of the exigencies which arise in the course of cementing the well. The arrangements of conduits, valves, pumps, and other parts of the device may be varied to suit conditions, the showing in Figure 9 being largely diagrammatic.

Reverting to the forms of the device shown in Figures 1 to 8, it will be understood that any of the devices of Figures 1, 2, 5, 6, 7 and 8 may be substituted in the arrangement shown in Figure 9 for the mixing device shown in this latter figure, the piping being changed, of course, to supply the various nozzles shown. For some purposes it may be desirable to enlarge the sump 54, the purpose of this sump being to afford means whereby the cement grout, or the like, may be delivered and deposited, under pressure, if desired, continuously and substantially simultaneously with the production of the mixture, so as to gain the advantages of quick set made possible by the nature of the mixture.

Having thus described my invention and illustrated its use, what I claim as new and desire to secure by Letters Patent is:—

1. A mixing device comprising an upright substantially cylindrical mixing chamber, a lateral outlet conduit having therein a constricted zone, means for introducing a jet of liquid at high velocity into said upright mixing chamber, such introduction being in the direction of flow of the mass at the point of such introduction, means for delivering solid pulverulent material directly into said mixing chamber.

2. An improved mixer of the character disclosed, comprising an upright mixing chamber provided with a feed hopper, means being provided for introducing fluid to the mixing chamber in the same direction of flow as pursued by the material supplied to the mixing chamber from the hopper; said means comprising a supply pipe entering the hopper laterally and provided with a nozzle in angular relation to such pipe and lying substantially in the longitudinal axis of the hopper; said mixing chamber being provided with an outlet, there being a zone of constriction between such outlet and the mixing chamber; said outlet being laterally of the mixing chamber; and a discharge pipe in communication with said outlet; said discharge pipe being substantially of the same cross sectional area as the mixing chamber.

3. A cement grout mixer comprising an upright substantially cylindrical mixing chamber, a nozzle projecting downwardly into the upper end of said mixing chamber, a hopper surmounting said mixing chamber and opening directly thereinto, a lateral outlet conduit connected to the bottom of said mixing chamber, said conduit having a constricted zone therein.

4. A cement grout mixer comprising an upright substantially cylindrical mixing chamber, a nozzle projecting downwardly into the upper end of said mixing chamber, the axis of the said nozzle and the axis of said chamber being substantially coincident, a hopper mounted upon and opening directly into said chamber, and a lateral outlet conduit connected to the bottom of said mixing chamber, such conduit having a constricted zone therein.

5. In a mixing device for producing cement grout, a substantially cylindrical mixing receptacle, means for introducing dry cement in a downward direction into the said cylindrical receptacle, a downwardly directed nozzle leading into said cylindrical receptacle, a substantially horizontal outlet conduit leading from the lower part of said cylindrical receptacle, such conduit having a constricted zone therein.

6. In a mixing device for producing cement grout, a substantially cylindrical mixing receptacle, means for introducing dry cement in a downward direction into the said cylindrical receptacle, a downwardly directed nozzle leading into said cylindrical receptacle, the axis of the nozzle being coincident with the axis of the mixing receptacle, a substantially horizontal outlet conduit leading from the lower part of said cylindrical receptacle, such conduit having a constricted zone therein.

7. In a mixing device for producing cement grout, a substantially cylindrical mixing receptacle having a vertical axis, means for continuously introducing dry cement by gravity, into said receptacle, a downwardly directed nozzle leading into said cylindrical receptacle and terminating at near the top of said receptacle at about the middle of the cross-sectional area thereof, a substantially horizontal outlet conduit leading away from the lower part of said cylindrical receptacle, said conduit having a constriction therein.

8. In a mixing device for producing cement grout, a feed hopper, a substantially cylindrical mixing receptacle located directly below the same, a nozzle projecting downwardly into the top of said mixing receptacle at about the middle of said top, the whole of the cross-sectional area of the bottom of said mixing receptacle being connected with a lateral outlet conduit having a diameter substantially less than that of the mixing chamber.

9. In a mixing device for producing cement grout, a feed hopper, a substantially cylindrical mixing receptacle, located directly below the same and connected thereto, a nozzle projecting downwardly into the top of said mixing receptacle at about the middle of said top, the whole of the cross-sectional area of the bottom of said mixing receptacle being connected with a lateral outlet conduit having a constriction therein, said receptacle having an unobstructed passage-way.

10. A mixer for producing fluid cement grout, including a feed hopper, a substantially cylindrical mixing chamber mounted below the same and adapted to receive dry cement therefrom, said chamber being wholly unobstructed interiorly, a downwardly projecting nozzle substantially concentric with said mixing chamber and terminating at near the upper end of said mixing chamber, and means for supplying liquid under pressure to said nozzle.

11. A mixer for producing fluid cement grout, including a feed hopper, a substantially cylindrical chamber mounted below the same and adapted to receive dry cement therefrom, a free unobstructed opening being provided from said hopper into said mixing chamber, a downwardly projecting nozzle substantially concentric with said mixing chamber and terminating at near the upper end of said mixing chamber, and means for supplying liquid under pressure to said nozzle, an outlet conduit leading from said mixing chamber having a portion thereof adapted to impede the efflux of said grout through the same.

12. A method of forming a cement grout which comprises continuously supplying dry cement in a downward direction by gravity, into a mixing chamber free from standing water; simultaneously and continuously directing a strong jet of liquid under pressure in a downward direction centrally into the mass of said dry cement in said mixing chamber, whereby the liquid and cement are mixed with each other, continuously allowing the exit of the cement grout from the lower part of the mixing chamber, while somewhat obstructing the flow of the grout therefrom, whereby the mixture is held in the mixing chamber sufficiently long to produce a thorough and uniform mixture; all of the liquid introduced being supplied by such downwardly directed jet of liquid, and all of the agitation beng produced by such downwardly directed jet of liquid.

13. The process of feeding dry cement and for reducing same to plastic state, which includes induction, by a high velocity stream of water, of dry cement into said stream for reducing the cement to plastic state, delivering such plastic cement to a temporary storage tank, controlling the velocity of said stream of water for varying the quantity of mixture delivered thereby, and then delivering such plastic cement from said storage tank by an independent source of pressure to the point of use.

14. The process of continuously feeding dry cement and for continuously reducing same to plastic state, which includes, induction, by a high velocity stream of water, of a quantity of dry cement into said stream for reducing the cement to plastic state, delivering such plastic cement to a temporary storage tank, controlling the velocity of said stream of water for varying the quantity of mixture delivered to the storage tank, then substantially continuously delivering such plastic cement from said tank under pressure by an independent source of pressure to a point of use, and varying the secondary source of pressure to feed the plastic mixture in accordance with its rate of mixture and delivery to said storage tank.

15. The process of feeding dry cement and for reducing same to plastic state, which includes induction, by a high velocity stream of water, of dry cement into said stream for reducing the cement to plastic state, delivering such plastic cement to a temporary storage tank, controlling the velocity of said stream of water for varying the quantity of mixture delivered thereby, then delivering such plastic cement from said storage tank by an independent source of pressure to a point of use, and then varying both the velocity of said stream and the secondary source of pressure so that the rate of delivery is substantially synchronized with the rate of mixture.

16. The process of continuously reducing cement to a semi-liquid state, and for continuously feeding such plastic cement which comprises introducing a high velocity stream of fluid into a quantity of cement, then discharging the mixture thus formed to a suitable storage tank, then varying the velocity of said stream and rate of discharge for regulating the quantity and consistency of the mixture delivered, then withdrawing the resultant plastic mixture from such tank under pressure for use, and then regulating either of or both the velocity of said stream and the pressure for withdrawing the mixture from the tank so as to produce a synchronization of the mixing and feeding steps.

17. The process of hydrating and synchronously delivering cement for use, which comprises forcing water under high velocity into a quantity of cement or the like, conducting the cement by such water pressure to a suitable container, and synchronously withdrawing the plastic cement under pressure for use.

18. The method of mixing a plurality of pulverulent materials which comprises continuously simultaneously supplying such materials in a downward direction by gravity into a mixing chamber free from standing water, simultaneously and continuously directing a strong jet of liquid under pressure centrally into the mass of said materials in said mixing chamber whereby the liquid and said materials are mixed with each other, continuously allowing the exit of the mixture from the lower part of the mixing chamber while somewhat obstructing the flow of the mixture therefrom, so that the mixture is held in the mixing chamber sufficiently long to produce a thorough and uniform mixture.

19. The method of mixing a plurality of pulverulent materials which comprises continuously simultaneously supplying such materials in a downward direction by gravity into a mixing chamber free from standing water, simultaneously and continuously directing a strong jet of liquid under pressure centrally into the mass of said materials in said mixing chamber whereby the liquid and said materials are mixed with each other, continuously allowing the exit of the mixture from the lower part of the mixing chamber.

20. The method of mixing a plurality of pulverulent materials which comprises continuously simultaneously supplying such materials in a downward direction by gravity into a mixing chamber free from standing water, simultaneously and continuously directing a strong jet of liquid under pressure in a downward direction centrally into the mass of said materials in said mixing chamber whereby the liquid and said materials are mixed with each other, continuously allowing the exit of the mixture from the lower part of the mixing chamber while somewhat obstructing the flow of the mixture therefrom, so that the mixture is held in the mixing chamber sufficiently long to produce a thorough and uniform mixture.

21. The process of hydrating and synchronously delivering cement for use, which comprises introducing cement into the path of a high velocity stream of water in a zone of reduced pressure, conducting the mixture to a container to permit the dissipation of freed air, and synchronously conducting the cement from the container to the point of use.

22. A method of treating and handling cement for cementing wells or the like which comprises introducing cement into the path of a high velocity stream of water in a zone of reduced pressure created by an accelerated velocity of the stream of water, subjecting the mixture to an increased pressure, arresting the mixture to dissipate the freed air of the mixture, and introducing the mixture under pressure to the point of use.

23. A method of treating and handling cement for cementing wells or the like which comprises producing a pumpable cement mixture by introducing cement into the path of a high velocity stream of water and continuously pumping the mixture so produced to the point of use.

24. A method of treating and handling cement for cementing wells or the like which comprises depositing cement in the path of a high velocity stream of water, conducting the mixture by the force of the stream to a container, and pumping the mixture from the container to the point of use.

25. In apparatus for treating and handling cement for cementing wells or the like, the combination of a mixing chamber a mixing pump adapted to direct a stream of water through the mixing chamber of a cement mixer, means for introducing cement into the mixing chamber in the path of the stream of water, and a delivery pump adapted to pump into the well the mixture passing from the mixing chamber.

26. In apparatus for treating and handling cement for cementing wells or the like, the combination of a mixing chamber a mixing pump communicating with the mixing chamber of a cement mixer, means for introducing cement into the path of a stream of water projected by the mixing pump through the mixing chamber, a container for receiving the mixture passing from the mixing chamber, and a delivery pump in communication with the container and a point of use for pumping mixture from the container to the point of use.

27. In apparatus for treating and handling cement for cementing wells or the like, the combination of means for introducing a stream of liquid under high velocity into a mixing chamber, means for introducing cement under the influence of and into said stream for mixing the liquid and said cement, means for arresting flow of the mixture for a period sufficient to permit the escape of free air from the mixture, and means for substantially continuously delivering the mixture to a point for use.

In testimony whereof I have hereunto signed my name in the presence of the two subscribed witnesses.

ERLE P. HALLIBURTON.

Witnesses:
D. THOMPSON,
MILDRED PRESSLY.